US005112424A

United States Patent [19]

Cook

[11] Patent Number: 5,112,424

[45] Date of Patent: May 12, 1992

[54] LOW TEMPERATURE MULTI-LAYER EXTRUSION COATING PROCESS

[75] Inventor: John W. Cook, Kingsport, Tenn.

[73] Assignee: Eastman Kodak Company, Rochester, N.Y.

[21] Appl. No.: 403,215

[22] Filed: Sep. 1, 1989

[51] Int. Cl.[5] .............................................. B29C 47/06

[52] U.S. Cl. .............................. 156/243; 156/244.11; 156/244.27; 156/327; 156/334

[58] Field of Search .............. 156/243, 244.11, 244.27, 156/327, 334

[56] References Cited

U.S. PATENT DOCUMENTS 3,418,396 12/1968 Edwards .
3,887,640 6/1975 Edwards et al. .
4,146,521 3/1979 Godfrey .............................. 156/334
4,337,297 6/1982 Karim et al. ........................ 156/327
4,337,298 6/1982 Karim et al. ........................ 156/327
4,407,690 10/1983 White ............................ 156/244.27
4,526,919 7/1985 Edwards .
4,528,312 7/1985 Edwards .

FOREIGN PATENT DOCUMENTS 798908 11/1968 Canada .
130399 7/1984 Japan ............................. 156/244.11
WO88/09354 12/1988 PCT Int'l Appl. .

Primary Examiner—Caleb Weston
Attorney, Agent, or Firm—S. E. Reiter; Mark A. Montgomery; William P. Heath, Jr.

[57] ABSTRACT

Process for applying multi-layer extrusion coatings to substrate at low temperature is described, employing as one extrusion coating layer a defined polyethylene-containing component, and, as the second extrusion coating layer at least one second extrudable polymeric composition. Also provided are novel extrusion coated articles comprising substrate having coated thereon defined polyethylene-containing component and at least one other extrudable polymeric composition. These articles display good adhesion of extrusion coating material to the substrate without the degradation of the extrudable coatings caused by exposure to excessive levels of heat as is required for successful extrusion coating employing prior art materials.

19 Claims, 1 Drawing Sheet

LOW TEMPERATURE MULTI-LAYER EXTRUSION COATING PROCESS

This invention relates to multi-layer extrusion coating processes. In one aspect, this invention relates to polyethylene compositions useful for multi-layer extrusion coating processes. In another aspect, this invention relates to multi-layer extrusion coating processes which can be carried out at unusually low extrusion coating temperatures, and which are capable of producing very thin coating thicknesses.

BACKGROUND OF THE INVENTION

Extruding a coating of a polyolefin or blends of polyolefins onto a substrate, such as paper or aluminum foil, to form an extrusion coated substrate, is well known in the art. Extruding multiple layers of polymers including polyolefins as well as other materials in a process known as co-extrusion is also well known. Various polyethylenes and blends of polyethylenes have been used widely as extrusion coating compositions. Such materials have also been used in coextrusion processes as the layer against the substrate so as to adhere the coating to the substrate. Unfortunately, the use of polyethylene-based coatings has several drawbacks. For example, such materials frequently lack the desired level of adhesion to typical extrusion coated substrates, especially when extrusion coating is carried out at low temperatures and/or at extremely high coating speeds. In addition, polyethylene-based coatings typically require extrusion coating temperatures that generate excessive odor and are not compatible, in co-extrusions, with some heat sensitive polymers.

Low temperature extrusion coating processes are useful when applying coextrusions with other polymers which are temperature sensitive. Low temperature extrusion coating processes are also useful when employing substrates which are temperature sensitive. Low temperature extrusion coating processes are also useful when applying polymeric coatings which contain additives which are temperature sensitive. When prior art extrusion coating materials are employed at low extrusion temperatures, they are not capable of adhering to the substrate with the desired degree of adhesion.

High extrusion coating speeds are desirable so as to enable economically attractive operation of extrusion coating equipment. High extrusion coating speeds are also desirable so as to permit the preparation of very thin extrusion coatings.

What is desired, therefore, are polyethylene-based materials which are capable of being coextruded and applied in uniform coatings to a variety of substrates employing a process which operates at temperatures below those ordinarily used for extrusion coating processes.

STATEMENT OF THE INVENTION

In accordance with the present invention, there is provided a low temperature, multi-layer extrusion coating process employing as one coextrusion layer a polyethylene component comprising a defined polyethylene material and specified quantities of defined tackifying resins, along with a variety of other extrudable polymeric compositions. The invention process is capable of being operated with a variety of substrates and other polymeric materials and involves employing a multilayer extrusion coating to a substrate at an extrusion coating temperature of no greater than about 480° F. (about 250° C.). The invention multi-layer extrusion coating process is capable of producing novel articles which comprise substrate having coated thereon the specified polyethylene composition and at least one other extrudable polymeric composition. These articles display good adhesion of extrusion coating to substrate without the degradation of extrudable coating caused by exposure to excessive heat as required by prior art coextrusion processes.

DETAILED DESCRIPTION OF THE INVENTION

Figure 1:
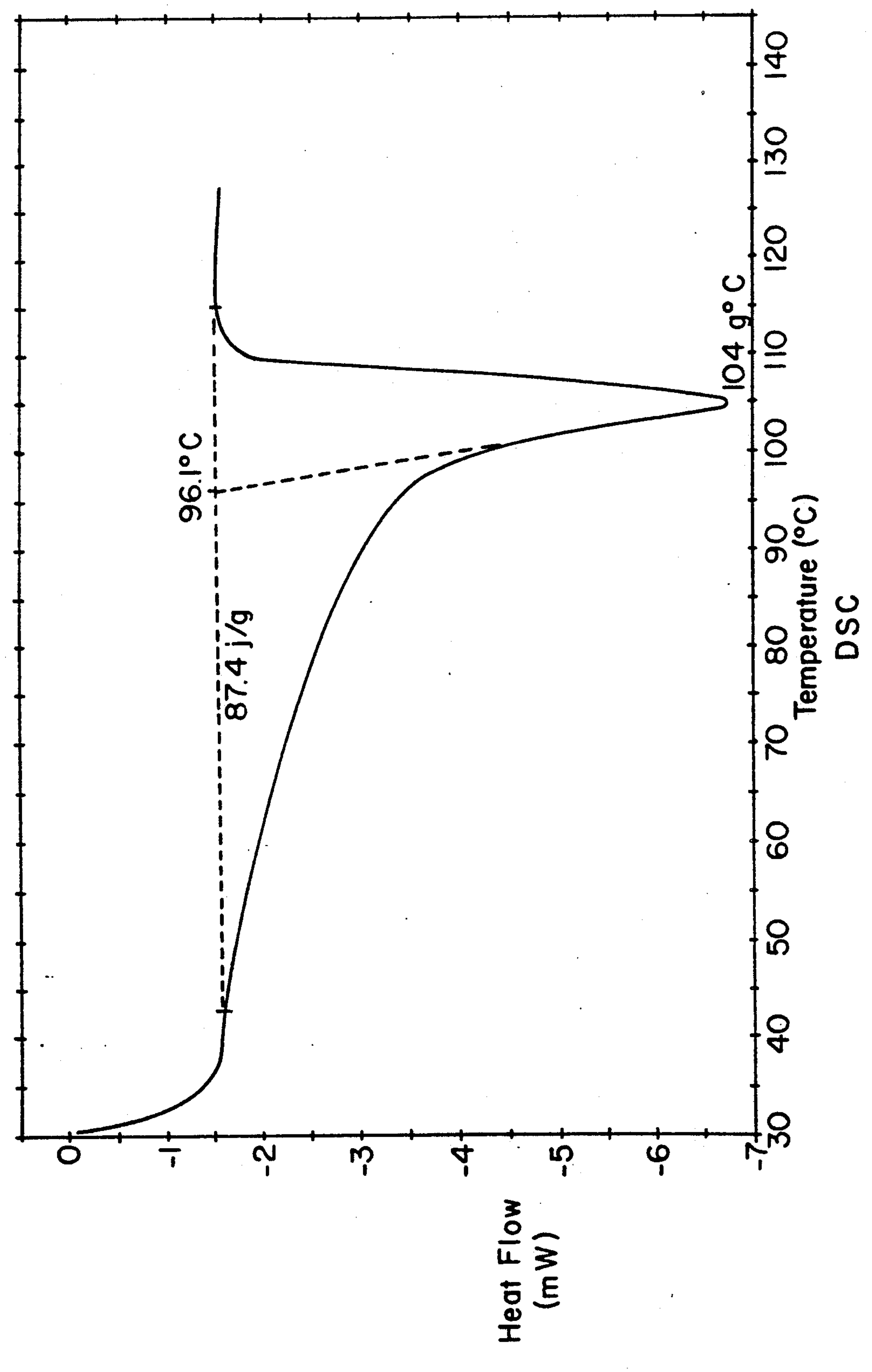
FIG. 1 is a differential scanning calorimetry (DSC) curve of a polyethylene-containing composition contemplated for use in the practice of the present invention.

In accordance with the present invention, there is provided a process for the low-temperature multi-layer extrusion coating of a substrate with a first, polyethylene-containing layer which is subjected to a temperature no greater than about 480° F., and at least one additional layer comprising at least one second extrudable composition, said process comprising:

applying to at least one surface of said substrate first, polyethylene-containing composition comprising:
- (a) a polyethylene component having a melt index in the range of about 10 up to 100 dg per minute at 190° C. and having a sufficiently broad molecular weight distribution so that the resulting composition is capable of being extrusion coated at a temperature in the range of 400° up to 480° F. to a thickness of no greater than 0.0003 inches (0.0075 mm) at a speed of at least 1000 feet per minute (300 meters per minute), and
- (b) in the range of about 5 up to 15 wt %, based on the weight of the total composition, of a hydrocarbon tackifying resin having a Ring and Ball Softening Point in the range of about 125° up to 140° C., and at least one second extrudable composition selected from:
- polyethylenes having a melt index different than the melt index of said first polyethylene component,
- polyethylenes having a density different than the density of said first polyethylene component,
- polyethylenes modified with polymer additives,
- polypropylene homopolymers, comonomers, copolymers, and terpolymers, optionally modified with polymer additives,
- polyethylene comonomers, copolymers and terpolymers, including extrudable ionomers, optionally modified with polymer additives,
- extrudable polymers of higher olefins having in the range of 4 up to 8 carbon atoms, optionally modified with polymer additives,
- extrudable polyvinylidene chloride, optionally modified with polymer additives,
- extrudable polyamides, optionally modified with polymer additives, or
- extrudable polyesters, optionally modified with polymer additives;

wherein said process is carried out by multi-layer extrusion coating of said substrate; and wherein the temperature of said first, polyethylene-containing layer falls in the range of about 400° up to 480° F. during the extrusion process.

In accordance with another embodiment of the present invention, there are provided articles of manufacture comprising a substrate having adhered thereto a multilayer polymeric laminate comprising:

(i) a polyethylene composition comprising:
   (a) a polyethylene component having a melt index in the range of about 10 up to 100 dg per minute at 190° C. and having a sufficiently broad molecular weight distribution so that the resulting composition is capable of being extrusion coated at a temperature in the range of 400° up to 480° F. to a thickness of at least 0.0075 mm at a speed of at least 300 meters per minute, and
   (b) in the range of about 5 up to 15 wt %, based on the weight of the total composition, of a hydrocarbon tackifying resin having a Ring and Ball Softening Point in the range of about 90° up to 150° C.; and
(ii) at least one second extrudable composition selected from:
   polyethylenes having a melt index different than the melt index of said first polyethylene component,
   polyethylenes having a density different than the density of said first polyethylene component,
   polyethylenes modified with polymer additives,
   polypropylene homopolymers, comonomers, copolymers, and terpolymers, optionally modified with polymer additives,
   polyethylene comonomers, copolymers and terpolymers, optionally modified with polymer additives,
   extrudable polymers of higher olefins having in the range of 4 up to 8 carbon atoms, optionally modified with polymer additives,
   extrudable polyvinylidene chloride, optionally modified with polymer additives,
   extrudable polyamides, optionally modified with polymer additives, or
   extrudable polyesters, optionally modified with polymer additives.

Polyethylene compositions useful in the practice of the present invention are materials having a melt index at 190° C. falling in the range of about 10 up to 100 decigrams per minute. Preferred polyethylene components are materials having a melt index falling in the range of about 20 up to 80 decigrams per minute; with materials having melt index falling in the range of about 30 up to 80 being most preferred.

Polyethylene materials useful in the practice of the present invention are typically low density materials. Polyethylenes having densities in the range of about 0.915 up to 0.926 are presently preferred materials.

It is desirable that the polyethylene materials employed in the practice of the present invention have a sufficiently broad molecular weight distribution so that the resulting composition is capable of being extrusion coated at temperatures in the range of about 400° up to 480° F. (about 205° up to 250° C.). Those of skill in the art recognize that materials of very narrow molecular weight distribution will not be suitable for the desired extrusion coating application, while materials having intermediate, up to very broad molecular weight distributions, will be more suitable for the desired extrusion coating application. Typically, materials employed in the practice of the present invention will have a polydispersity index, i.e., ratio of weight average molecular weight (Mw) to number average molecular weight (Mn), of at least about 7.

It is also desirable that the polyethylene materials employed in the practice of the present invention have a minimum melting point onset temperature of at least about 95° C., as measured by differential scanning calorimetry (DSC). Materials having such melting properties provide excellent handling characteristics for extrusion coating applications.

A DSC curve for an exemplary invention composition is presented in FIG. 1. The composition employed to obtain this DSC curve is a material having a melt index of about 32 dg/mL and a density of about 0.916 g/cc. This material was prepared by blending 90 weight % of a low density polyethylene having a melt index of about 20 dg/mL with 10 weight % of Nirez 1135 tackifying resin. From the Figure, it can be seen that the sample has an onset melting point (determined by extrapolation as shown) of 96.1° C., with an actual melting point of about 105° C.

Polyethylene materials useful in the practice of the present invention can be prepared by polymerizing relatively high purity ethylene in a stirred reactor at pressures above about 1000 atmospheres and temperatures above about 200° C., using a peroxide-type of catalyst, such as, for example, di-tertiarybutyl peroxide. Lower purity ethylene containing inert materials such as methane, ethane, carbon dioxide, and the like, may be introduced into the ethylene feed to control the purity thereof. Publications to which the reader is directed for further general details on the preparation of suitable low density polyethylenes are the text *Polythene* by Renfrew and Morgan, at pp. 11–17 and the article in Petroleum Refiner (1956) by Thomasson, McKetta and Ponder, found at p. 191.

The tackifying resins useful in the compositions of this invention have Ring and Ball softening points of about 90° C. to 150° C. and can be a hydrocarbon resin such as DAC-B hydrocarbon resin prepared according to the process disclosed in U.S. Pat. No. 3,701,760 as well as other hydrocarbon resins, synthetic and natural polyterpenes, rosin esters and the like.

One suitable hydrocarbon tackifying resin is a hydrocarbon resin having a softening point of 130° C. and available commercially as Eastman Resin H-130 from Eastman Chemical Products, Inc. Other hydrocarbon tackifying resins can be prepared by the polymerization of monomers consisting primarily of olefins and diolefins and include, for example, the residual byproduct monomers resulting from the manufacture of isoprene. These hydrocarbon tackifying resins typically exhibit a ring and ball softening point of from about 90° to 150° C.; an acid number of from about 0 to 2; a saponification value of less than about 1. Examples of such commercially available resins of this type are "Wingtack 95" as sold by the Goodyear Tire and Rubber Co., the Sta-Tac and Super Sta-Tac resins sold by the Reichhold Chemical Corp, and Eastotac, a hydrogenated polymer of $C_5$ hydrocarbons (sold by Eastman Chemical Products, Inc.). Also suitable are polymers of vinyl aromatic monomers, such as Piccotex 120 (available from Hercules Chemical), a copolymer of $\alpha$-methyl styrene and vinyl toluene. This material has a RBSP of about 120° C.

Additional suitable resins are the rosin ester resins and the terpene polymers such as the polymeric, resinous materials including the dimers as well as high polymers obtained by polymerization and/or copolymerization of terpene hydrocarbons such as the alicyclic, monocyclic, and bicyclic monoterpenes and their mixtures, including allo-ocimene, carene, isomerized pinene, pinene (e.g., Nirez (available from Reichhold Chemical), a polymer of $\beta$-pinenes), dipentene, terpinene, terpinolene, limonene, terpentine, a terpene cut or fraction, and various other terpenes. Particularly useful resin esters are the amber colored pentaerythritol ester of rosin having an acid number of about 7 to 16 and a Ring and Ball softening point of about 100° C. to 110° C., such as the Zonester family of products available from Arizona Chemical. One such resin is the pentaerythritol ester of tall oil rosin having a Ring and Ball softening point of 100° C. and an acid number of about 11.

The quantity of tackifying resin employed in the invention compositions can vary widely, typically falling within the range of about 5 up to 15 weight percent, based on the weight of the total composition. Preferred quantities of tackifying resin fall within the range of about 7 up to 10 weight percent. These quantities are preferred because at these levels of tackifier, maximum adhesion per quantity of tackifier added is achieved. Thus, at lower levels of tackifier, reduced adhesion is observed while little added benefit is obtained with higher levels of tackifier.

As noted above, the invention compositions can optionally further contain in the range of about 25 up to 200 parts per million of a transition metal pro-oxidant. Transition metal compounds contemplated for use in the practice of the present invention are salts formed by combining transition metals such as cobalt, manganese, and copper with organic acids of sufficiently high molecular weight to give salts soluble in the polymer blends employed.

As employed herein, the term "transition metal" is intended to include elements having greater than 8, and less than 18, electrons in the outer shell of the ionic species. Transition metals are thus usually capable of electron transitions between their outer shells. Thus, the variable valency states which result render these elements capable of inducing oxidation reactions. In practice, those transition elements which are highly toxic and/or radioactive are extremely rare and costly, and thus are not normally encountered in industrial use as oxidation catalysts. More typically encountered transition metals whose salts and complexes are useful for such applications include cerium, zinc, copper, silver, nickel, cobalt, iron, manganese, chromium, and vanadium. These elements can be used in the form of such salts as possess an adequate level of solubility in the polymer melt, typically including such forms as stearates, oleates, behenates, miristates, erucates, lineoleates, naphthanates, or complexes such as acetonyl acetates, 8-hydroxyquinolinates, metal amine salt complexes, and the like, as well as mixtures of any two or more thereof.

Preferred quantities of pro-oxidant, when employed, fall in the range of about 100 up to 150 parts per million, based on the total weight of polymer composition.

In accordance with an alternative embodiment of the present invention, there may further be included in the invention compositions up to about 10 weight percent of a biodegradable organic polymer. Compounds contemplated by the term "biodegradable organic polymer" include polymeric materials which are themselves intrinsically sensitive to direct enzyme chain scission in the presence of micro-organisms which occur profusely in the environment. Exemplary materials contemplated by the above definition include polymeric carbohydrates such as corn starch.

When employed, quantities in the range of about 1 up to 10 weight percent of biodegradable organic polymer are typically employed. Preferably, in the range of about 4 up to 6 weight percent of biodegradable organic polymer will be employed.

The compositions of this invention may be prepared in various ways such as dry blending and then passing through a compounding extruder, compounding on a milling roll or in a Banbury mixer or by fusion. Any method whereby the components can be blended together will produce the desired blend. For example, pellets of each polymer can be blended mechanically and the blend then fed to an extruder where it is fused and extruded.

Additives, stabilizers, fillers and the like can be added to the compositions of the present invention. Such materials can be present in the components forming the polymer blend, or may be added when the polymers are blended to form the extrusion coating composition.

A wide variety of additional extrudable compositions are useful in the practice of the present invention, in addition to the first, polyethylene-containing composition described above. Contemplated are:

- polyethylenes having a melt index different than the melt index of said first polyethylene component,
- polyethylenes having a density different than the density of said first polyethylene component,
- polyethylenes modified with polymer additives,
- polypropylene homopolymers, comonomers, copolymers, and terpolymers, optionally modified with polymer additives,
- polyethylene comonomers, copolymers and terpolymers, including extrudable ionomers, optionally modified with polymer additives,
- extrudable polymers of higher olefins having in the range of 4 up to 8 carbon atoms, optionally modified with polymer additives,
- extrudable polyvinylidene chloride, optionally modified with polymer additives,
- extrudable polyamides, optionally modified with polymer additives, or
- extrudable polyesters, optionally modified with polymer additives;

as well as mixtures of any two or more thereof.

Each of the above polymeric compositions can be modified by addition of polymer additives, such as, for example, slip agents, antiblock agents, pigments (organic or inorganic), stabilizers (e.g., thermal, ultraviolet, flame retardants, antioxidants, and the like), starch based additives to impart biodegradability to the composition, fillers, and the like. Such additives can be physically blended with said polymers, chemically incorporated by copolymerization, grafting, or the like, and so forth.

Polypropylene materials contemplated for use in the practice of the present invention include polypropylene homopolymer as well as copolymers and terpolymers having incorporated therein such co-monomers as ethylene, maleic anhydride, 1-butene, 1-hexene, 4-methyl-1-pentene, hydroxyethyl methacrylate, acrylic acid, N-vinyl pyrrolidone, and the like, as well as mixtures of any two or more thereof.

Propylene polymers contemplated for use in the practice of the present invention also include a predominantly polypropylene-containing polymer backbone which has been further modified by such techniques as grafting with one or more of the co-monomers set forth above.

Polyethylene materials contemplated for use in the practice of the present invention include polyethylene homopolymer as well as copolymers and terpolymers having incorporated therein such co-monomers as:
vinyl acetate,
vinyl alcohol,
carbon monoxide
maleic anhydride,
ethyl methyl acrylate,
ethyl ethyl acrylate,
ethyl methyl pentene, or
ethyl acrylic acid,
and the like, as well as mixtures of any two or more thereof. As in the case with propylene-containing polymers, ethylene polymers contemplated for use in the practice of the present invention include a predominantly elthylene-containing polymer backbone which has been further modified by such techniques as grafting with one or more of the co-monomers set forth above.

Polymers of higher olefins contemplated for use in the practice of the present invention include poly(1-butene), poly(4-methyl-1-pentene), and the like.

Polyamides contemplated for use in the practice of the present invention include Nylon 6, Nylon 6/6, amorphous nylons, and the like.

Polyesters contemplated for use in the practice of the present invention include polyethylene terephthalate (PET), polybutylene terephthalate (PBT), polycyclohexanedimethanol terephthalate (PCT), and the like, as well as co-polyesters thereof.

Especially preferred polymers which are capable of high speed extrusion coating in combination with the first, polyethylene-containing composition include:

polyethylenes having a melt index different than the melt index of said first polyethylene component,
polyethylenes having a density different than the density of said first polyethylene component,
polyethylenes modified with polymer additives,
polypropylene homopolymers, comonomers, copolymers, and terpolymers, optionally modified with polymer additives,
polyethylene comonomers, copolymers and terpolymers, including extrudable ionomers, optionally modified with polymer additives, or
extrudable polyamides, optionally modified with polymer additives.

Especially preferred polymers which produce coated articles capable of being heat sealed in combination with the first polyethylene-containing composition include:

polyethylenes having a melt index lower than the melt index of said first polyethylene component, or
ethylene copolymers and terpolymers, including extrudable ionomers optionally modified with polymer additives.

Especially preferred polymers which provide coated articles having good barrier properties when used for a multi-layer extrusion coating process in combination with the first polyethylene-containing composition include:

polyethylene comonomers, copolymers and terpolymers, optionally modified with polymer additives,
extrudable polyvinylidene chloride, optionally modified with polymer additives, or
extrudable polyamides, optionally modified with polymer additives.

The presently most preferred polymer employed in the practice of the present invention in combination with the first polyethylene-containing composition are materials selected from:

polyethylene comonomers, copolymers and terpolymers with at least one co-monomer selected from:
vinyl acetate,
vinyl alcohol,
carbon monoxide,
maleic anhydride,
ethyl methyl acrylate,
ethyl ethyl acrylate,
ethyl methyl pentene, or
ethyl acrylic acid,
and the like, as well as mixtures of any two or more thereof;

wherein each of said ethylene comonomers, copolymers and terpolymers can optionally be modified with polymer additives.

Multi-layer extrusion coating processes are well known in the art and are well within the skill of the artisan. See, for example, U.S. Pat. No. 4,152,387, incorporated by reference in its entirety. Those of skill in the art can readily apply the compositions disclosed herein to such processes.

The laminate structure produced in the process of the present invention can have the first polyethylene-containing component present as the substrate contact layer, as the exterior barrier layer, or, where two or more other polymeric materials are coextruded with the polyethylene-containing composition, the polyethylene layer can be positioned as an adhesive tie-layer between the two or more additional extrudable compositions.

Substrates contemplated for use in the practice of the present invention include papers, paperboards, fibers, polymeric materials, metal foils, and the like. Polymeric substrates include polyolefins or functionally modified polyolefins, polyesters or functionally modified polyolefins, polyesters or functionally modified polyesters, ethylene-vinyl alcohol copolymers or functionally modified derivatives thereof, polyamides or functionally modified polyamides, and the like.

The invention compositions, upon application to substrate by extrusion coating techniques, form a destructive bond, i.e., the substrate-coating bond is sufficiently strong that efforts to separate the coating from the substrate cause destruction of either the coating or the substrate.

This invention can be further illustrated by the following examples of preferred embodiments thereof, although it will be understood that these examples are included merely for purposes of illustration and are not intended to limit the scope of the invention unless otherwise specifically indicated.

EXAMPLES

The co-extrusions described in the following examples were produced on an ER-WE-PA extrusion coating line with the following capabilities:

EXTRUDERS:
1) 2½ inch Main Extruder
2) 2 inch Satellite Extruders

FEEDBLOCK
ER-WE-PA Feedblock Technology Employing Feedblock Inserts To Produce Various 2, 3 and 5 layer coextrusions DIE
ER-WE-PA Model 300 Flex Lip Die With a 42 inch Maximum Deckled Width and a 0.020 inch Die Opening. Extruder Carriage capable of varying Die Opening to Nip Distance.

LAMINATOR:

Laminator Capable of Linespeed of 200–2000 fpm. Maximum Substrate Width of 32 inches. Chill Roll Width of 120 rms Matte Surface. Flame and Corona treatment of substrate available prior to coating.

Equipment manufactured by other vendors and designed for multilayer extrusion coating would be suitable to produce these and similar structures.

EXAMPLE 1

The invention process was demonstrated by applying to paperboard three layers which consisted of: paperboard/0.5-mil coating of PE blend/0.3-mil LDPE/0.5-mil LDPE. The PE blend had a melt index of 32 dg/min and a density of 0.916 g/cc and contained 10 percent by weight of a tackifier, Nirez 1135 (a polymerized $\beta$-pinene having a RBSP of about 135° C.). The LDPE had a melt index of 4.0 dg/min and a density of 0.924 g/cc.

The invention article was formed by coextrusion coating at a line speed of 300-fpm. The melt temperature of the PE blend was 450° F. and the melt temperature of the two LDPE layers were both held at 540° F.

Each interface, i.e., board/PE Blend/LDPE, exhibited destructive bond strengths.

This example shows the ability of the PE blend to (a) act as a tie layer at 450° F., and (b) provide destructive bonding to both paper and polyethylene at 450° F.

EXAMPLE 2

The structure in Example 1 was further coextruded to a faster line speed of 700-fpm. Melt temperatures were held the same as in Example 1. Layer thicknesses, however, were slightly thinner at this speed: 0.4-mil PE Blend/0.2-mil LDPE/0.4-mil LDPE. Again, destructive bonds were exhibited at all interfaces.

This example shows the ability of the PE Blend to (a) act as a tie layer at commercial line speeds while still (b) providing destructive bonds at these fast linespeeds.

EXAMPLE 3

In this example, the PE Blend was replaced with an unmodified pure LDPE having a melt index of 13 dg/min and a density of 0.916-g/cc. This provided a structure of: paperboard/13 melt index LDPE/LDPE/LDPE, with the melt temperature of the 13 melt index LDPE also at 450° F. and the two LDPE layers at 540° F.

Layer thickness and line speed were the same as in Example 1.

This structure and extrusion conditions resulted in an unsatisfactory product because of total bond failure at the paperboard/13 melt index LDPE interface.

This example shows the inability of a pure unmodified polyethylene to replace the PE Blend in a tie layer to paper at a melt temperature of 450° F.

EXAMPLE 4

In this example, a structure of paperboard/0.5-mil PE Blend/0.3-mil ethylene vinyl alcohol (EVOH) was coextruded at a line speed of 300-fpm. The PE Blend, had a melt temperature of 450° F., and the EVOH was at 490° F.

This structure, and conditions, permitted destructive bonds between layers. The thermally sensitive EVOH remained intact, with no evidence of degradation.

This example shows the practical ability of the invention process to be used to introduce a tie layer at low temperature in a structure containing a layer of thermally-sensitive EVOH.

EXAMPLE 5

In this example, a structure of paperboard/0.14-mil PE blend/0.43-mil polypropylene/0.14-mil polypropylene was produced by coextrusion coating at 850-fpm. The PE Blend was extruded at a melt temperature of 460° F., and the polypropylene layers at 510° F. Both polypropylene layers were from the same formulation, a homopolymer having a flow rate of 60-dg/min.

The adhesion of the 0.14-mil PE Blend to the paperboard exceeded the tensile strength of the three polyolefin layers. And, more importantly, the PE Blend-polypropylene interface exhibited a destructive bond.

This example shows the ability of the PE Blend to act as a polyethylene tie-layer for polypropylene, with the tie layer being extruded at 460° F.

The invention has been described in detail with particular reference to preferred embodiments thereof, but it will be understood that variations and modifications can be effected within the spirit and scope of the invention.

I claim:

1. A process for the low-temperature multi-layer extrusion coating of a substrate with a first, polyethylene-coating layer which is subjected to a temperature no greater than about 480° F., and at least one additional layer comprising at least one second extrudable composition, said process comprising:

applying to at least one surface of said substrate a polyethylene-containing composition to form said first, polyethylene-containing layer, comprising:

(a) a polyethylene component having a melt index in the range of about 10 up to 100 dg per minute at 190° C. and having a sufficiently broad molecular weight distribution so that the resulting composition is capable of being extrusion coated at a temperature less than about 480° F. to a thickness as thin as 0.0003 inches (0.0075 mm) at a speed of at least 1000 feet per minute (300 meters per minute), and (b) in the range of about 5 up to 15 wt %, based on the weight of the total composition, of a hydrocarbon tackifying resin having a Ring and Ball Softening Point in the range of about 125° up to 140° C., and at least one second extrudable composition selected from:

polyethylenes having a melt index different than the melt index of said first polyethylene component, polyethylenes having a density different than the density of said first polyethylene component, polyethylenes modified with polymer additives, polypropylene homopolymers, comonomers, copolymers, and terpolymers, optionally modified with polymer additives, polyethylene comonomers, copolymers and terpolymers, including extrudable ionomers, optionally modified with polymer additives, extrudable polymers of higher olefins having in the range of 4 up to 8 carbon atoms, optionally modified with polymer additives, extrudable polyvinylidene chloride, optionally modified with polymer additives, extrudable polyamides, optionally modified with polymer additives, or extrudable polyesters, optionally modified with polymer additives;

wherein said process is carried out by multi-layer extrusion coating of said substrate; and wherein the temperature of said polyethylene-containing composition is no greater than about 480° F. during the extrusion process.

2. A process in accordance with claim 1 wherein said first, polyethylene-containing layer has a thickness no greater than about 0.0075 mm.

3. A process in accordance with claim 1 wherein said at least one second extrudable composition is selected from:

polyethylenes having a melt index different than the melt index of said first polyethylene component, polyethylenes having a density different than the density of said first polyethylene component, polyethylenes modified with polymer additives, polypropylene homopolymers, comonomers, copolymers, and terpolymers, optionally modified with polymer additives, polyethylene comonomers, copolymers and terpolymers, including extrudable ionomers, optionally modified with polymer additives, or extrudable polyamides, optionally modified with polymer additives.

4. A process in accordance with claim 3 wherein said extrusion coating process is capable of substantially uniformly coating at least 300 m per minute of substrate.

5. A process in accordance with claim 1 wherein said at least one second extrudable composition is a heat sealable composition selected from:

polyethylene having a melt index lower than the melt index of said first polyethylene component, or polyethylene comonomers, copolymers and terpolymers, including extrudable ionomers, optionally modified with polymer additives.

6. A process in accordance with claim 1 wherein said at least one second extrudable composition provides a barrier layer, and is selected from:

polyethylene comonomers, copolymers and terpolymers, optionally modified with polymer additives, extrudable polyvinylidene chloride, optionally modified with polymer additives, or extrudable polyamides, optionally modified with polymer additives.

7. A process in accordance with claim 1 wherein said at least one second extrudable composition is selected from:

polyethylene comonomers, copolymers and terpolymers with at least one co-monomer selected from:

vinyl acetate,
vinyl alcohol,
carbon monoxide,
maleic anhydride,
ethyl methyl acrylate,
ethyl ethyl acrylate,
ethyl methyl pentene, or
ethyl acrylic acid, wherein each of said polyethylene copolymers and terpolymers can optionally be modified with polymer additives.

8. A process in accordance with claim 1 wherein said substrate is selected from:

papers,
paperboards,
fibers,
polymeric materials, or
metal foils.

9. A process in accordance with claim 8 wherein said polymeric materials are selected from:

polyolefins or functionally modified polyolefins, polyesters or functionally modified polyesters, ethylene-vinyl alcohol copolymers, or polyamides or functionally modified polyamides.

10. A process in accordance with claim 1 wherein said polyethylene component has a melt index in the range of about 20 up to 80 dg per minute.

11. A process in accordance with claim 1 wherein said polyethylene component has a density of at least 0.915 g/cc.

12. A process in accordance with claim 1 wherein said hydrocarbon tackifying resin is selected from polymerized $\beta$-pinenes, hydrogenated polymers of $C_5$ hydrocarbons, $\alpha$-methyl styrene-vinyl toluene copolymers or pentaerythritol esters of tall oil rosin.

13. A process in accordance with claim 1 containing in the range of about 7 up to 10 wt % of said hydrocarbon tackifying resin.

14. A process in accordance with claim 13 wherein said tackifying resin is a polymerized $\beta$-pinene.

15. A process in accordance with claim 1 wherein said first polyethylene-containing layer is the layer that contacts the substrate.

16. A process in accordance with claim 1 wherein said first polyethylene-containing layer is an exterior barrier layer.

17. A process in accordance with claim 1 comprising said first polyethylene-containing layer and at least two additional extrudable compositions.

18. A process in accordance with claim 17 wherein said first polyethylene-containing layer is an adhesive tie-layer between two additional extrudable compositions.

19. A process in accordance with claim 1 wherein said polyethylene-containing composition has a differential scanning calorimetry curve substantially as shown in FIG. 1.

* * * * *